(12) United States Patent
Kwon et al.

(10) Patent No.: US 10,826,544 B2
(45) Date of Patent: Nov. 3, 2020

(54) SIGNAL FILTERING AND SIGNAL PROCESSING APPARATUS AND METHOD

(71) Applicant: SAMSUNG ELECTRONICS CO., LTD., Suwon-si (KR)

(72) Inventors: Ui Kun Kwon, Hwaseong-si (KR); Chang Soon Park, Chungju-si (KR); Seungkeun Yoon, Seoul (KR); Sang Joon Kim, Hwaseong-si (KR); Jaechun Lee, Seoul (KR); Changmok Choi, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/733,617

(22) Filed: Jan. 3, 2020

(65) Prior Publication Data

US 2020/0145034 A1    May 7, 2020

Related U.S. Application Data

(63) Continuation of application No. 16/512,890, filed on Jul. 16, 2019, now Pat. No. 10,530,404, which is a continuation of application No. 15/349,230, filed on Nov. 11, 2016, now Pat. No. 10,382,074.

(30) Foreign Application Priority Data

Dec. 9, 2015    (KR) .................. 10-2015-0174790

(51) Int. Cl.
*H04K 1/02* (2006.01)
*H04B 1/04* (2006.01)
*H04L 25/06* (2006.01)
*H04B 1/12* (2006.01)
*H04L 25/03* (2006.01)

(52) U.S. Cl.
CPC ........... *H04B 1/0475* (2013.01); *H04B 1/123* (2013.01); *H04L 25/03261* (2013.01); *H04L 25/061* (2013.01)

(58) Field of Classification Search
CPC ... H04L 1/0003; H04L 1/0071; H04L 5/0007; H04L 1/0009; H04L 27/0008; H04L 27/368; H04L 25/03343; H03F 1/3247; H03F 1/3294; H03F 2201/3233
USPC ................................ 375/296, 295, 316, 219
See application file for complete search history.

(56) References Cited

U.S. PATENT DOCUMENTS

| | | | |
|---|---|---|---|
| 5,269,313 A | 12/1993 | DePinto | |
| 9,351,653 B1 | 5/2016 | Harrison | |
| 2006/0020218 A1 | 1/2006 | Freeman et al. | |
| 2008/0150631 A1* | 6/2008 | Kim | H03F 3/45475 330/103 |

(Continued)

FOREIGN PATENT DOCUMENTS

| | | |
|---|---|---|
| JP | 2013-85702 A | 5/2013 |
| KR | 10-0400213 B1 | 11/2003 |

(Continued)

*Primary Examiner* — Zewdu A Kassa
(74) *Attorney, Agent, or Firm* — NSIP Law

(57) ABSTRACT

A signal processing method, a signal filtering apparatus, and a signal processing apparatus are provided. An input signal may be input into a filter having a passband, a superfluous signal of the passband may be output from the filter, and a target signal may be obtained by subtracting the superfluous signal from the input signal.

6 Claims, 6 Drawing Sheets

(56) References Cited

U.S. PATENT DOCUMENTS

| | | |
|---|---|---|
| 2010/0164612 A1 | 7/2010 | Koyrakh |
| 2010/0168595 A1 | 7/2010 | Lee et al. |
| 2011/0144460 A1 | 6/2011 | Oh et al. |
| 2011/0306892 A1 | 12/2011 | Kim et al. |
| 2012/0116198 A1 | 5/2012 | Veen et al. |
| 2012/0265080 A1 | 10/2012 | Yu et al. |
| 2013/0197380 A1 | 8/2013 | Oral et al. |
| 2014/0121565 A1 | 5/2014 | Kim |

FOREIGN PATENT DOCUMENTS

| | | |
|---|---|---|
| KR | 10-2006-0119472 A | 11/2006 |
| KR | 10-2008-0074413 A | 8/2008 |
| KR | 10-2012-0089780 A | 8/2012 |
| KR | 10-2014-0147545 A | 12/2014 |
| KR | 10-2015-0012094 A | 2/2015 |
| KR | 10-2015-0077571 A | 7/2015 |

* cited by examiner

SIGNAL FILTERING AND SIGNAL PROCESSING APPARATUS AND METHOD

CROSS-REFERENCE TO RELATED APPLICATION(S)

This application is a continuation of U.S. patent application Ser. No. 16/512,890 filed on Jul. 16, 2019 which is a continuation of U.S. patent application Ser. No. 15/349,230 filed on Nov. 11, 2016, now U.S. Pat. No. 10,382,074 B2, which claims the benefit under 35 USC § 119(a) of Korean Patent Application No. 10-2015-0174790, filed on Dec. 9, 2015, at the Korean Intellectual Property Office, the entire disclosure of which is incorporated herein by reference for all purposes.

BACKGROUND

1. Field

The following description relates to a signal processing and signal filtering method of subtracting a noise signal.

2. Description of Related Art

Due to the population getting older, increasing medical costs, and a dearth of personnel engaged in special medical services, research is being conducted on information technology (IT)-healthcare convergence technology in which IT is applied to medical technology. Due to improvement in the IT-healthcare convergence technology, monitoring a health condition of an individual may be done anywhere the individual goes in daily life, such as, for example, at home and work. With improvement in technology in the mobile healthcare field, a health condition of a moving user may be monitored anywhere and at any time.

An application for mobile healthcare may monitor a health condition in an environment in which a user moves and may operate based on a mobile device, such as, for example, a wearable device, thereby increasing the user's convenience. The wearable device may have limitations of performance of an individual sensor, amount of power used, and size of product, compared to a specialized non-wearable medical device. Such limitations may cause a signal to noise ratio (SNR) of a biosignal measured from the wearable device to deteriorate. Thus, the wearable device may require a low complexity technology for stably processing a noise signal in addition to the bio-signal.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a signal processing method including inputting an input signal into a filter having a predetermined passband, obtaining an superfluous signal of the passband through the filter, and obtaining a target signal by subtracting the unnecessary signal from the input signal by inputting the input signal and the unnecessary signal into a subtractor.

The filter may be a low frequency band pass filter.

The filter may be an infinite impulse response (IIR) filter.

The input signal input into the subtractor may be a signal obtained by compensating for a time delay in obtaining the unnecessary signal.

The input signal may be a signal obtained by subtracting an estimated direct current (DC) offset from a raw signal.

The signal processing method may further include determining whether a compensation for the DC offset is to be performed on the target signal, and performing the compensation for the DC offset on the target signal based on a result of the determining.

The determining may include determining that the compensation for the DC offset is performed in response to the target signal having a frequency lower than a predetermined frequency, and that the compensation for the DC offset is not performed in response to the target signal having the frequency higher than the predetermined frequency.

In accordance with another embodiment, there is provided a signal filtering apparatus including a filter having a predetermined passband, and a subtractor configured to output a target signal obtained by subtracting an unnecessary signal from the input signal, wherein an input signal and the unnecessary signal of the passband obtained by applying the input signal to the filter are input into the subtractor.

The input signal may be a biosignal on which preprocessing is performed.

The preprocessing may be subtracting a direct current (DC) offset.

The unnecessary signal may include a DC component and a signal corresponding to a band of a frequency lower than a predetermined cutoff frequency.

In accordance with still another embodiment, there is provided a signal processing method including estimating a direct current (DC) offset from a raw signal, generating an input signal by subtracting the DC offset from the raw signal, and obtaining a target signal by subtracting an unnecessary signal of a predetermined passband by inputting the input signal into a filter having the predetermined passband.

The obtaining may include obtaining the unnecessary signal through the filter, and obtaining the target signal by subtracting the unnecessary signal from the input signal by inputting the input signal and the unnecessary signal into a subtractor.

The input signal input into the subtractor may be a signal obtained by compensating for a time delay in obtaining the unnecessary signal.

The signal processing method may further include determining whether a compensation for the DC offset is to be performed on the target signal, and performing the compensation for the DC offset on the target signal based on a result of the determining.

In accordance with yet another embodiment, there is provided a signal processing apparatus including a direct current (DC) offset subtractor configured to estimate a DC offset from a raw signal and output an input signal by subtracting the DC offset from the raw signal, and a filtering unit configured to output a target signal by subtracting an unnecessary signal of a predetermined passband from the input signal.

The signal processing apparatus may further include a DC offset compensator configured to determine whether a compensation for the DC offset is to be performed on the target signal and perform the compensation for the DC offset on the target signal based on a result of the determining.

The DC offset compensator may determine that the compensation for the DC offset is performed in response to the target signal having a frequency lower than a predetermined frequency, and that the compensation for the DC offset is not performed in response to the target signal having the frequency higher than the predetermined frequency.

The filtering unit may include a filter having a predetermined passband, and a subtractor configured to input the input signal and the unnecessary signal obtained by applying the input signal to the filter and output the target signal obtained by subtracting the unnecessary signal.

Other features and aspects will be apparent from the following detailed description, the drawings, and the claims.

Figure 1:
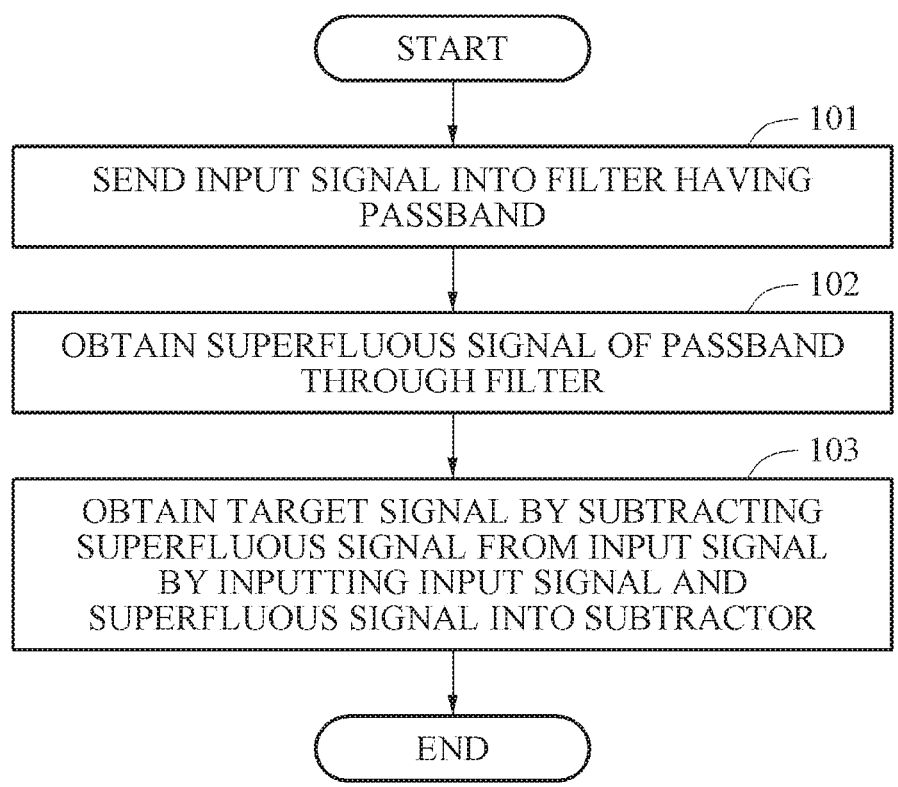
FIG. 1 is a diagram illustrating an example of a method of signal processing.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art after a full understanding of the present disclosure. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Specific structural or functional descriptions of examples provided in the present disclosure are exemplary to merely describe the examples. The examples may be modified and implemented in various forms, and the scope of the examples is not limited to the descriptions provided in the present specification.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

As used herein, the singular forms "a," "an," and "the," are intended to include the plural forms as well, unless the context clearly indicates otherwise.

An example of a signal filtering and signal processing apparatus may be implemented as a part of various types of products, such as, for example, personal computers, laptop computers, tablet computers, smart phones, mobile devices, televisions, smart home appliances, intelligent vehicles, kiosks, home appliances, content players, communication systems, image processing systems, graphics processing systems, wearable devices (such as, for example, a ring, a watch, a pair of glasses, glasses-type device, a bracelet, an ankle bracket, a belt, a necklace, an earring, a headband, a helmet, a device embedded in the cloths), or any other consumer electronics/information technology (CE/IT) device. For example, the examples are applicable to user recognition by a smart phone, a mobile device, and a smart home system. The examples are applicable to a payment service requiring user recognition. Further, the examples are applicable to an intelligent automobile system which automatically starts up an engine after recognizing a user.

FIG. 1 is a diagram illustrating an example of a signal processing method. The signal processing method of FIG. 1 is performed by a signal processing apparatus including at least one processor. The operations in FIG. 1 may be performed in the sequence and manner as shown, although the order of some operations may be changed or some of the operations omitted without departing from the spirit and scope of the illustrative examples described. Many of the operations shown in FIG. 1 may be performed in parallel or concurrently.

To subtract a signal from a raw signal or to subtract remaining components except for a desired signal, various filtering schemes may be applied. For example, the filtering scheme may subtract an interference signal existing in a neighboring band except for a signal in a desired band from a reception signal in a communication system. In another example, the the filtering scheme may subtract a component of a frequency band other than a frequency band of interest from a biosignal measured through a measuring apparatus.

A biosignal refers to a signal essentially generated from body activity of a creature, such as, for example, electrocardiography (ECG), photoplethysmogram (PPG), ballistocardiogram (BCG), blood oxygen saturation level ($SpO_2$), electrodermal activity (EDA), electroencephalography (EEG), electrooculography (EOG), galvanic skin response (GSR), and electromyography (EMG). Based on an analysis of the biosignal obtained from a biosignal sensor various pieces of information associated with a heartbeat may be obtained and differing health related values of an individual may be estimated from the ECG or the PPG signal. An EMG sensor may measure a condition change of muscles by sensing a current flowing in the muscles. Monitoring an amount of current in the muscles based on the EMG may be done for a muscle strengthening program and an EMG sensor may be used to recognize a movement by classifying patterns of contraction and relaxation of different muscles of a body.

A PPG signal includes an alternating current (AC) component, a direct current (DC) component, a component close to a DC, and an additive white Gaussian noise (AWGN) of an arterial signal. The DC component includes a system bias, an ambient light, a vein PPG, and respiration, and the DC component may be distributed in a frequency band less than 0.3 hertz (Hz). Since a signal of the AC component from which the DC component and a noise signal of the PPG signal are subtracted is distributed in a frequency band from 0.3 to 50 Hz, a process of subtracting a signal of a frequency band greater than 50 Hz and a signal within a frequency band from 0 to 0.3 Hz may be required. To subtract a low frequency signal of a narrow band from 0 to 0.3 Hz, an elaborate filter may be designed. In a process of subtracting a signal of the band, a signal delay or signal distortion may occur.

A digital filter may be designed by setting a passband or a cutoff frequency and defining a filter value based on filter types and filter orders according to use or purpose. The designed digital filter may be used to extract a desired signal by subtracting a noise from a raw signal. For example, the digital filter may be a finite impulse response (FIR) filter, an infinite impulse response (IIR) filter, and a zero phase filter (ZPF). The digital filter may be used to extract a signal of a band of interest or to subtract a noise from a raw signal. The FIR filter may require a design of a filter having a length greater than or equal to thousands of taps to subtract a signal of a frequency band having a narrow interval. Thus, a signal delay may be unavoidable and calculation complexity may increase in a filtering process, so that the FIR filter is not appropriate for a wearable device to process a biosignal. In response to the IIR filter being used instead of using the FIR filter, the calculation complexity may decrease, but distortion may occur in a signal band. Signal filtering and processing methods and apparatuses are disclosed to apply filtering technology for subtracting the noise from the raw signal and to extract the signal of the band of interest in the wearable device. In another embodiment, a filtering scheme having low calculation complexity to effectively subtract the noise and to minimize the distortion of the signal is disclosed.

In an example, in 101, an input signal is sent into a filter having a passband. In an example, the passband of the filter may be predetermined. In an example, the passband of the filter may be defined in advance to include a frequency band except for band of interest.

In an example, the filter may be a low frequency band pass filter. In this example, the band of interest may be a high frequency band. In another example, the filter may be a high frequency band pass filter. In this example, the band of interest may be a low frequency band. The filter into which the input signal is input may be designed to be a band pass filter, and the passband of the filter may be variously applicable based on design methods and design conditions. The filter may be designed to be an IIR or an FIR, but the filter is not limited thereto. For example, in response to the input signal being a PPG signal, the IIR filter may be applied as the low frequency band pass filter to subtract a signal of a low frequency band from 0 to 0.3 Hz. However, this is only an example, and a design of the filter may be variously changed and applied based on the band of interest.

In an example, in 102, a superfluous signal of the passband of the input signal is obtained through the filter into which the input signal is input. The superfluous signal may be a signal that is to be subtracted from the input signal.

In an example, in 103, the input signal and the superfluous signal are input into a subtractor, and a target signal is obtained by subtracting the superfluous signal from the input signal based on an output of the subtractor. In this example, a signal of a band of interest to be obtained from an input signal is referred to as a target signal and a signal subtracted from the input signal to obtain the target signal is referred to as a superfluous signal. The superfluous signal includes a signal to be subtracted from the input signal, for example, a noise, a system bias and an ambient light. An operation of subtracting the superfluous signal from the input signal may be controlled by a processor, for example.

In an example, the input signal input into the subtractor is a signal obtained by compensating for a time delay in obtaining the superfluous signal. In response to the time delay in applying the input signal to the filter and obtaining the superfluous signal is delayed, a compensation for the delayed time may be performed on the input signal, and the superfluous signal may be subtracted from the input signal on which the compensation is performed.

In an example, the input signal is a signal obtained by subtracting the DC offset from the raw signal. In response to a signal, having a large DC offset being applied to the filter, a setting time of the signal obtained through filtering may be required. In response to the DC offset being subtracted before the signal that is applied to the filter, the setting time may be reduced. In response to the DC offset being estimated from the raw signal and the input signal being obtained by subtracting the estimated DC offset from the raw signal being applied to the filter, a setting time of the target signal may be reduced.

In an example, in response to the input signal being the signal obtained by subtracting the estimated DC offset from the raw signal, a compensation for the DC offset may be performed on the target signal. For example, in response to the target signal having a frequency lower than a preset frequency, the compensation for the DC offset is performed on the target signal since the band of interest of the target signal includes the DC component. In another example, in response to the target signal having the frequency higher than the preset frequency, the compensation for the DC offset is not performed on the target signal since the DC component is to be excluded from the band of interest of the target signal.

Figure 2:
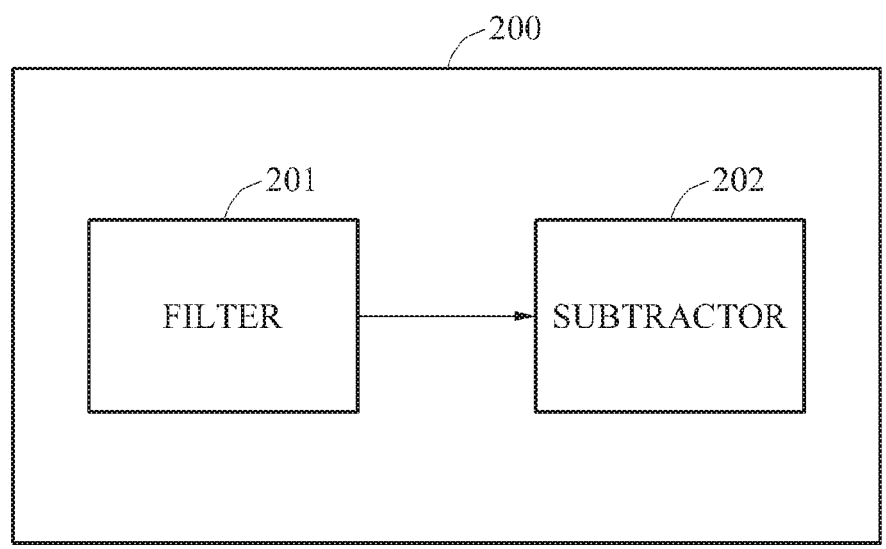
FIG. 2 illustrates an example of a configuration of a signal filtering apparatus.

FIG. 2 illustrates an example of a configuration of a signal filtering apparatus.

In an example, a signal filtering apparatus 200 includes a filter 201 and a subtractor 202. In an example, the filter 201 may have a preset passband and output a superfluous signal of the passband by filtering an input signal to the passband.

In an example, the subtractor 202 may receive the input signal and the superfluous signal output by the filter 201. The subtractor 202 may output a target signal by subtracting the superfluous signal from the input signal. In this example, the operation of inputting and outputting a signal into the filter 201 and the subtractor 202 may be controlled by a processor.

In an example, the input signal may be a raw signal on which preprocessing is performed, and the raw signal may include a biosignal. The preprocessing performed on the raw signal may include an operation of subtracting a direct current (DC) offset.

In an example, the DC offset may be estimated from the raw signal, such as, for example, the ECG, the PPG, and the EMG. The estimated DC offset may be subtracted from the raw signal, for example, during preprocessing, and may be input into the filter 201. The target signal may be obtained through the subtractor 202.

Figure 3:
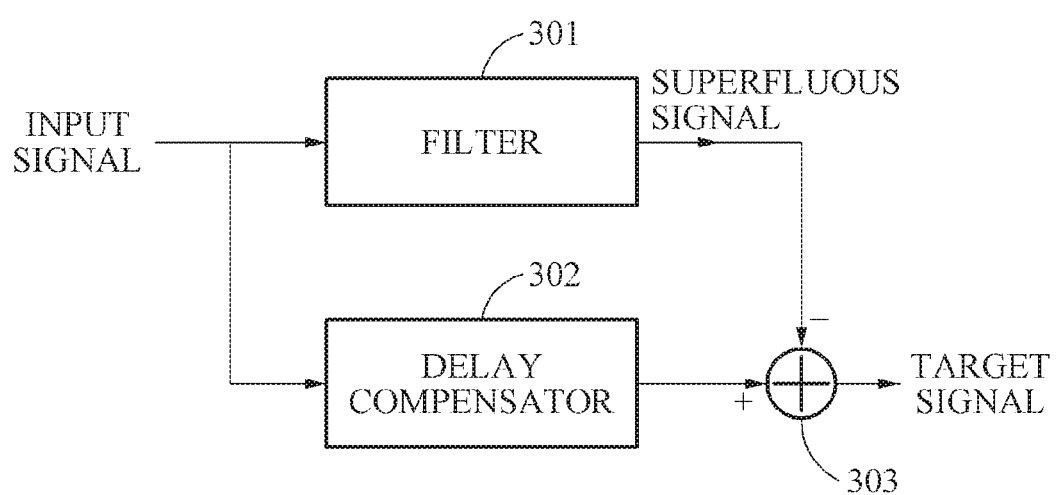
FIG. 3 illustrates an example of a configuration of a signal filtering apparatus.

FIG. 3 illustrates an example of a configuration of a signal filtering apparatus.

In an example, a band of a signal to be subtracted from an input signal may be estimated. The input signal may be applied to a filter 301 having the estimated band of the signal as a passband. The filter 301 outputs a superfluous signal of the passband from the input signal.

In response to the superfluous signal being output through the filter 301, a propagation delay of the signal may occur. Thus, compensation for a time delay by the filter 301 may be performed on the input signal before the superfluous signal is subtracted from the input signal. A delay compensator 302 performs, on the input signal, the compensation for a time delay in outputting the superfluous signal obtained by the input signal passing through the filter 301, and inputs the time-delayed input signal into an adder-subtractor 303.

The adder-subtractor 303 outputs a target signal by subtracting the superfluous signal from the time-delayed input signal using the time-delayed input signal output from the delay compensator 302 and the superfluous signal output from the filter 301.

Figure 4:
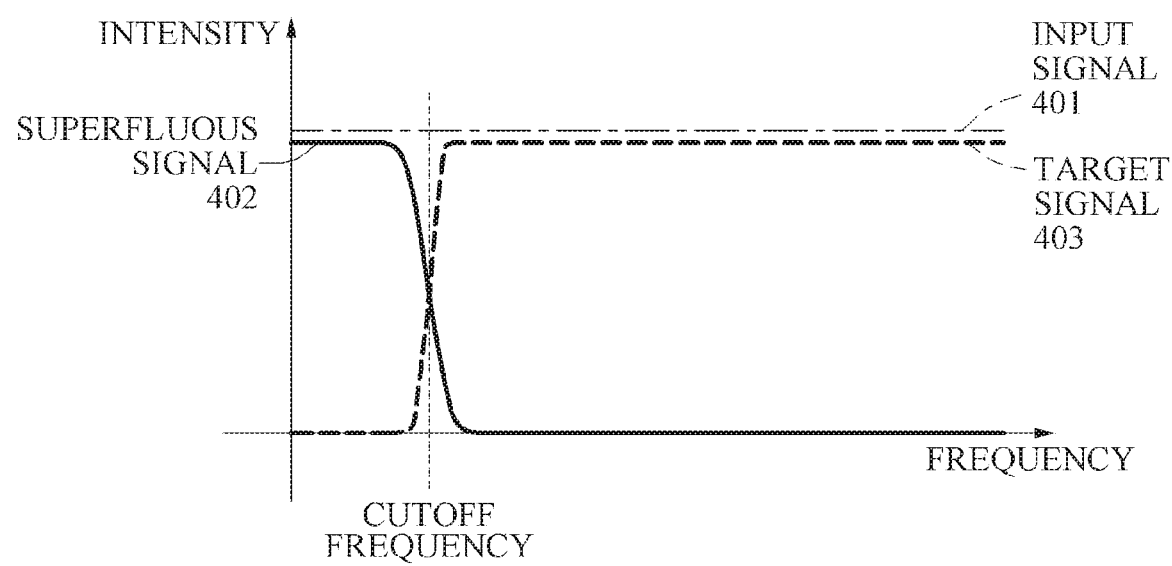
FIG. 4 is a diagram illustrating an example of an input signal, an superfluous signal, and a target signal.

FIG. 4 is a diagram illustrating an example of an input signal, a superfluous signal, and a target signal.

In an example, in response to an input signal 401 input into a filter, a superfluous signal 402 output through a filter, and the superfluous signal 402 subtracted from the input signal 401, the input signal 401, the target signal 403, and the superfluous signal 402 may be represented as illustrated in the graph of FIG. 4. The graph of FIG. 4 represents an example in which a target signal 403 is a signal of a high frequency band. In this example, a signal filtering apparatus may be replaced with a high pass filter (HPF). In response to the target signal 403 being a signal of a low frequency band, the signal filtering apparatus may be replaced as a low pass filter (LPF). The foregoing may be variously applicable based on a design method.

The superfluous signal 402 is extracted from the input signal 401 through a filter having a preset passband of a frequency lower than a cutoff frequency. The target signal 403 in a band of interest may be obtained by subtracting the extracted superfluous signal 402 from the input signal 401.

When the superfluous signal 402 is extracted through the filter having the preset passband, the superfluous signal 402 in the passband may be extracted with low calculation complexity where an infinite impulse response (IIR) filter is used.

Figure 5:
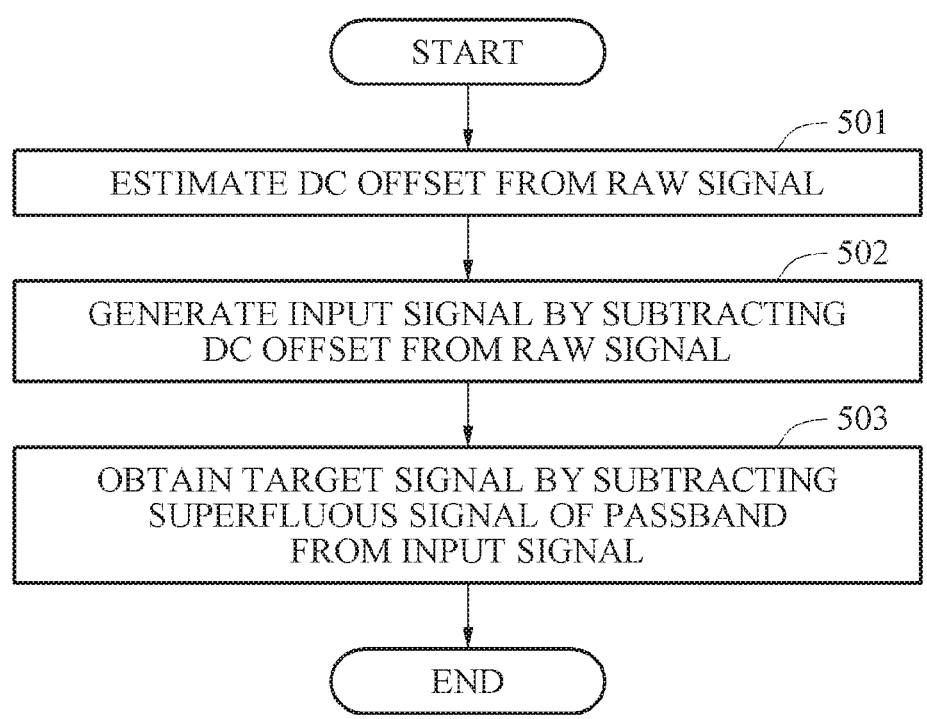
FIG. 5 is a diagram illustrating an example of a signal processing method.

FIG. 5 is a diagram illustrating an example of a signal processing method. The method of signal processing of FIG. 5 is performed by a signal processing apparatus including at least one processor. The operations in FIG. 5 may be performed in the sequence and manner as shown, although the order of some operations may be changed or some of the operations omitted without departing from the spirit and scope of the illustrative examples described. Many of the operations shown in FIG. 5 may be performed in parallel or concurrently. In addition to the description of FIG. 5 below, the above descriptions of FIGS. 1-4, are also applicable to FIG. 5, and are incorporated herein by reference. Thus, the above description may not be repeated here.

In 501, a direct current (DC) offset is estimated from a raw signal. In an example, in response to the raw signal of which the DC offset is great being input into a filter, a setting time greater than or equal to seconds for converging a signal output from the filter having a preset passband may be required.

In 502, the input signal obtained by subtracting the estimated DC offset from the raw signal is generated. The setting time of the filter may be reduced in response to the input signal obtained by subtracting the DC offset from the raw signal being applied to the filter before the raw signal is applied to the filter.

In 503, a target signal is obtained by subtracting a superfluous signal of the passband by inputting the input signal into the filter having the passband. In an example, the superfluous signal may be obtained from the input signal input through the filter having the passband, and the input signal and the superfluous signal may be input into a subtractor. The target signal may be obtained by subtracting, by the subtractor, the superfluous signal from the input signal, and the input signal input to the subtractor may be a signal obtained by compensating for a time delay in obtaining the superfluous signal.

In an example, a compensation for the DC offset may be performed on the target signal based on determining whether the compensation for the estimated DC offset is to be performed on the target signal. For example, it may be determined that the compensation for the DC offset is to be performed in response to the target signal having a frequency lower than a predetermined frequency, and it may be determined that the compensation for the DC offset is to be performed in response to the target signal having the frequency higher than the predetermined frequency. The examples described above with reference to FIGS. 1 through 4 may be applicable to an operation of subtracting the superfluous signal from the input signal. However, the operation of subtracting the superfluous signal from the input signal is not limited thereto.

Figure 6:
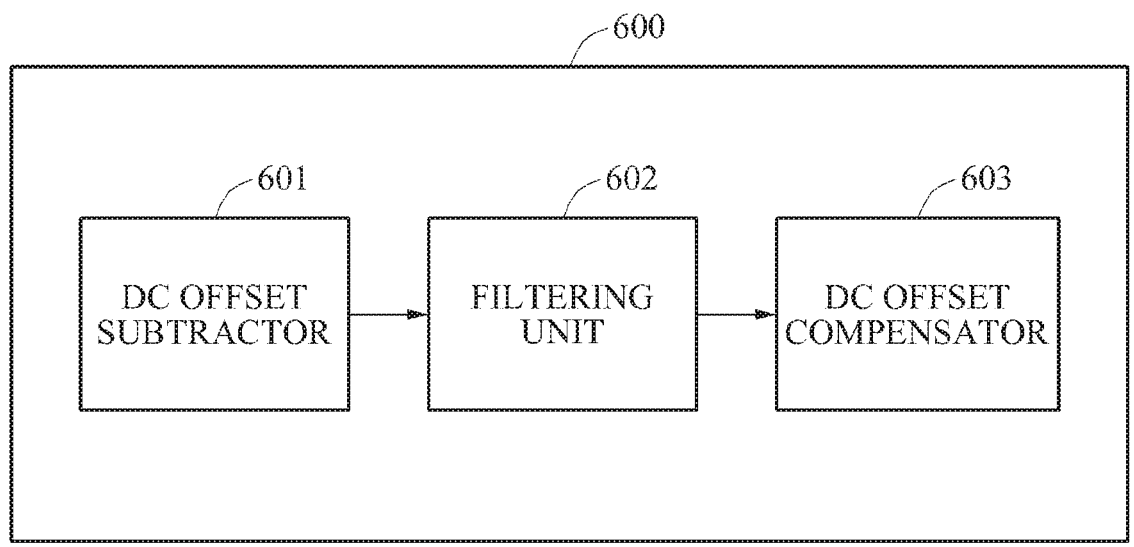
FIG. 6 is a diagram illustrating an example of a configuration of a signal processing apparatus.

FIG. 6 illustrates an example of a configuration of a signal processing apparatus in accordance with an embodiment.

A signal processing apparatus 600 includes a direct current (DC) offset subtractor 601, a filtering unit 602, and a DC offset compensator 603.

The DC offset subtractor 601 estimates a DC offset from a raw signal and outputs an input signal by subtracting the DC offset from the raw signal. In an example, the DC offset is estimated by inquiring about information known in advance or an operation of estimating a value of the DC offset from the raw signal.

The filtering unit 602 outputs a target signal by subtracting a superfluous signal of a passband from the input signal. Although not illustrated in FIG. 6, the filtering unit 602 may include a filter having a passband and a subtractor. In an example, the passband may be preset. The filter of the filtering unit 602 may extract the superfluous signal of the passband with respect to an applied input signal and output the extracted superfluous signal. The subtractor of the filtering unit 602 may receive the superfluous signal and the input signal, and output the target signal by subtracting the superfluous signal from the input signal. The input signal input into the subtractor may be a signal obtained by compensating for a time delay in passing through the filtering unit 602.

The DC offset compensator 603 determines whether to perform compensation for the DC offset on the target signal and performs the compensation for the DC offset based, if desired. The DC offset compensator 603 performs the compensation for the DC offset in response to the target signal having a frequency lower than a preset frequency, and the DC offset compensator 603 does not perform the compensation for the DC offset in response to the target signal having the frequency higher than the preset frequency.

Figure 7:
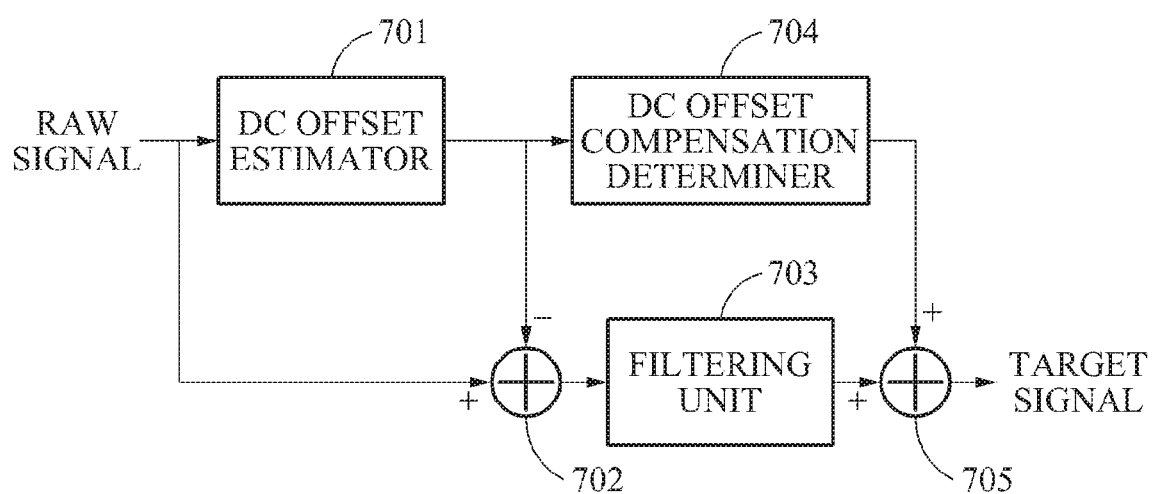
FIG. 7 illustrates an example of a configuration of a signal processing apparatus.

FIG. 7 illustrates an example of a configuration of a signal processing apparatus.

Referring to FIG. 7, a direct current (DC) offset estimator 701 receives a raw signal, estimates a DC offset from the raw signal, outputs the estimated DC offset, and inputs the output DC offset into an adder-subtractor 702. The adder-subtractor 702 receives the raw signal and the DC offset, and outputs a signal by subtracting the DC offset from the raw signal. The signal output by the adder-subtractor 702 is referred to as an input signal.

A filtering unit 703 extracts a superfluous signal of a passband from the input signal, which is output from the adder-subtractor 702. The filtering unit 703 outputs the target signal obtained by subtracting the superfluous signal from the input signal. The filtering unit 703 inputs the output target signal to an adder-subtractor 705.

A DC offset compensation determiner 704 receives information on the estimated DC offset and the raw signal from the DC offset estimator 701 and determines whether a compensation for the DC offset is to be performed on the target signal is required. In response to the target signal being a signal corresponding to a band of a frequency higher than a predetermined frequency, the DC offset compensation determiner 704 inputs the DC offset into the adder-subtractor 705 since the compensation for the DC offset is required. In response to the target signal being a signal corresponding to the band of the frequency lower than the predetermined frequency, the DC offset compensation determiner 704 does not input the DC offset to the adder-subtractor 705 since the compensation for the DC offset is not required.

The adder-subtractor 705 outputs the target signal on which the compensation for the DC offset is performed using the target signal output from the filtering unit 703 and the DC offset output from the DC offset compensation determiner 704.

Figure 8:
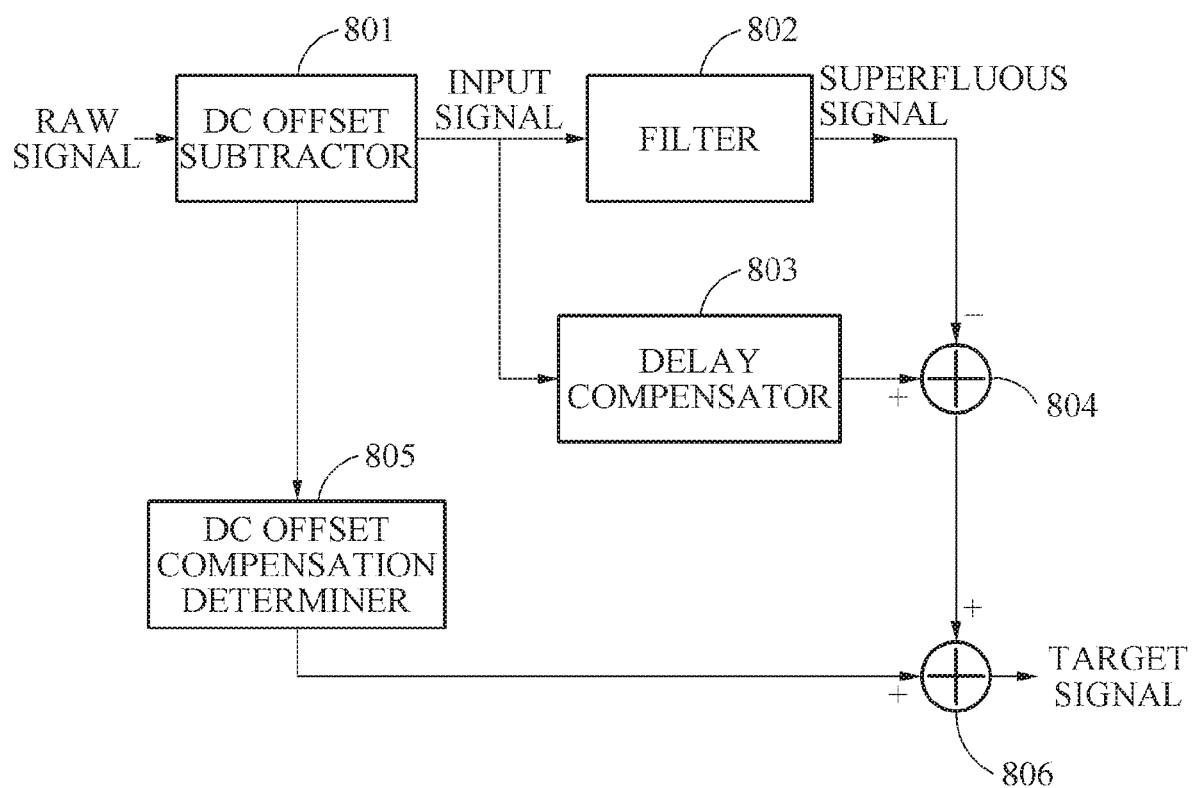
FIG. 8 illustrates an example of a configuration of a signal processing apparatus.

FIG. 8 illustrates still an example of a configuration of a signal processing apparatus.

Referring to FIG. 8, a direct current (DC) offset subtractor 801 receives a raw signal, subtracts an estimated DC offset from the raw signal, and outputs an input signal. The DC offset subtractor 801 inputs the input signal into a filter 802 and a delay compensator 803.

The filter 802 has a passband. The filter 802 outputs a superfluous signal of the input signal.

The delay compensator 803 performs time delay on the input signal output from the DC offset subtractor 801. The delay compensator 803 performs, on the input signal, a compensation for a time delay in extracting the superfluous signal through the filter 802. The delay compensator 803 outputs the input signal on which the compensation for the time delay is performed.

An adder-subtractor 804 outputs a target signal by subtracting the superfluous signal output from the filter 802 from the input signal output from the delay compensator 803.

The DC offset compensation determiner 805 receives information on the raw signal and the DC offset estimated from the DC offset subtractor 801, determines whether the compensation for the DC offset is to be performed on the target signal, and outputs the DC offset requiring the compensation based on the determination. An adder-subtractor 806 receives the target signal and the DC offset output from the DC offset compensation determiner 805, performs the compensation for the DC offset on the target signal, and outputs the target signal on which the compensation for the DC offset is performed.

As a non-exhaustive illustration only, the signal filtering apparatus 200 and 600 may refer to or be implement in mobile devices such as, for example, a mobile phone, a cellular phone, a smart phone, a wearable smart device (such as, for example, a ring, a watch, a pair of glasses, glasses-type device, a bracelet, an ankle bracket, a belt, a necklace, an earring, a headband, a helmet, a device embedded in the cloths), a personal computer (PC), a laptop, a notebook, a subnotebook, a netbook, or an ultra-mobile PC (UMPC), a tablet personal computer (tablet), a phablet, a mobile internet device (MID), a personal digital assistant (PDA), an enterprise digital assistant (EDA), a digital camera, a digital video camera, a portable game console, an MP3 player, a portable/personal multimedia player (PMP), a handheld e-book, an ultra mobile personal computer (UMPC), a portable lab-top PC, a global positioning system (GPS) navigation, a personal navigation device or portable navigation device (PND), a handheld game console, an e-book, and devices such as a high definition television (HDTV), an optical disc player, a DVD player, a Blue-ray player, a setup box, robot cleaners, a home appliance, content players, communication systems, image processing systems, graphics processing systems, other consumer electronics/information technology (CE/IT) device, or any other device capable of wireless communication or network communication consistent with that disclosed herein. The mobile device may be implemented in a smart appliance, an intelligent vehicle, or in a smart home system.

The signal filtering apparatus 200 and 600 may also be implemented as a wearable device, which is worn on a body of a user. In one example, a wearable device may be self-mountable on the body of the user, such as, for example, a watch, a bracelet, or as an eye glass display (EGD), which includes one-eyed glass or two-eyed glasses. In another non-exhaustive example, the wearable device may be mounted on the body of the user through an attaching device, such as, for example, attaching a smart phone or a tablet to the arm of a user using an armband, incorporating the wearable device in a cloth of the user, or hanging the wearable device around the neck of a user using a lanyard.

The apparatuses, units, modules, devices, and other components illustrated in FIGS. 2-3 and 6-8 that perform the operations described herein with respect to FIGS. 1 and 5 implemented by hardware components. Examples of hardware components include controllers, sensors, generators, drivers, and any other electronic components known to one of ordinary skill in the art. In one example, the hardware components are implemented by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1 and 5 that perform the operations described herein are performed by computing hardware as described above executing instructions or software to perform the operations described herein.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A photoplethysmogram (PPG) signal processing method, comprising:
   obtaining a PPG signal through a biosignal sensor;
   generating an input signal by subtracting a DC offset from the PPG signal;
   inputting the input signal to a first processing path and a second processing path, wherein the first processing path comprises a low pass filter that has a cutoff frequency and the second processing path comprises a delay compensator configured to compensate for a time delay related to the low pass filter; and
   obtaining a target signal by subtracting a signal obtained from the first processing path from a signal obtained from the second processing path.

2. The method of claim 1, wherein the target signal has a frequency higher than 0.3 hz.

3. The method of claim 1, wherein the target signal has a frequency lower than 50 hz.

4. A wearable device, comprising:
   a sensor configured to measure a PPG signal; and
   a signal processing apparatus comprising:
      an adder-subtractor configured to generate a input signal by subtracting a DC offset from the measured PPG signal, and configured to input the input signal to a first processing path and a second processing path;
      a low pass filter disposed in the first processing path, and configured to have a cutoff frequency;
      a delay compensator disposed in the second processing path, and configured to compensate for a time delay related to the low pass filter; and
      a subtractor configured to obtain a target signal by subtracting a signal obtained from the first processing path from a signal obtained from the second processing path.

5. The wearable device of claim 4, wherein the target signal has a frequency higher than 0.3 hz.

6. The wearable device of claim 4, wherein the target signal has a frequency lower than 50 hz.

* * * * *